(12) United States Patent
Van Drentham-Susman

(10) Patent No.: US 7,104,698 B1
(45) Date of Patent: Sep. 12, 2006

(54) THRUST BEARING FOR DOWN-HOLE TOOL

(75) Inventor: Hector Filippus Alexander Van Drentham-Susman, Inverurie (GB)

(73) Assignee: Rotech Holdings, Ltd., Aberdeen (GB)

( * ) Notice: Subject to any disclaimer, the term of this patent is extended or adjusted under 35 U.S.C. 154(b) by 0 days.

(21) Appl. No.: 09/890,714

(22) PCT Filed: Feb. 3, 2000

(86) PCT No.: PCT/GB00/00314

§ 371 (c)(1),
(2), (4) Date: Aug. 3, 2001

(87) PCT Pub. No.: WO00/46478

PCT Pub. Date: Aug. 10, 2000

(30) Foreign Application Priority Data

Feb. 3, 1999 (GB) .................................. 9902253.5

(51) Int. Cl.
*F16C 19/10* (2006.01)
(52) U.S. Cl. ..................................... 384/611; 384/613
(58) Field of Classification Search ................ 384/613, 384/611, 615, 617, 609
See application file for complete search history.

(56) References Cited

U.S. PATENT DOCUMENTS

| 1,346,417 A | 7/1920 | Palmgren |
| 1,448,189 A | 3/1923 | Brunner |
| 4,220,380 A | 9/1980 | Crase et al. |
| 5,074,681 A | 12/1991 | Turner et al. |
| 5,690,434 A | 11/1997 | Beshoory et al. |

FOREIGN PATENT DOCUMENTS

| CH | 239592 | 2/1946 |
| DE | 938343 | 1/1956 |
| GB | 1344318 | 1/1974 |

*Primary Examiner*—Lenard A. Footland
(74) *Attorney, Agent, or Firm*—Gifford, Krass, Groh Sprinkle, Anderson & Citkowski, P.C.

(57) ABSTRACT

There is disclosed an improved bearing and particularly an improved bearing assembly (15, 15A), eg. a thrust bearing assembly, which may be used in down-hole applications, such as down-hole drilling applications. Thrust bearing assemblies for use in down-hole applications have the conflicting requirements of a thick shaft assembly and high axial load bearing capacity in a small cross-section. The invention, therefore, provides: a bearing assembly (15, 15A) having at least two bearing elements (400, 400A) spaced by a first body (500, 500A), the first body (500, 500A) having means for flexing. Thus when a load is applied to the bearing assembly (15, 15A) the first body (500, 500A) is caused to flex. In an embodiment the flexing means comprise at least one circumferential groove or notch (510, 510A) formed on the first body (500, 500A).

30 Claims, 3 Drawing Sheets

THRUST BEARING FOR DOWN-HOLE TOOL

Figure 1:
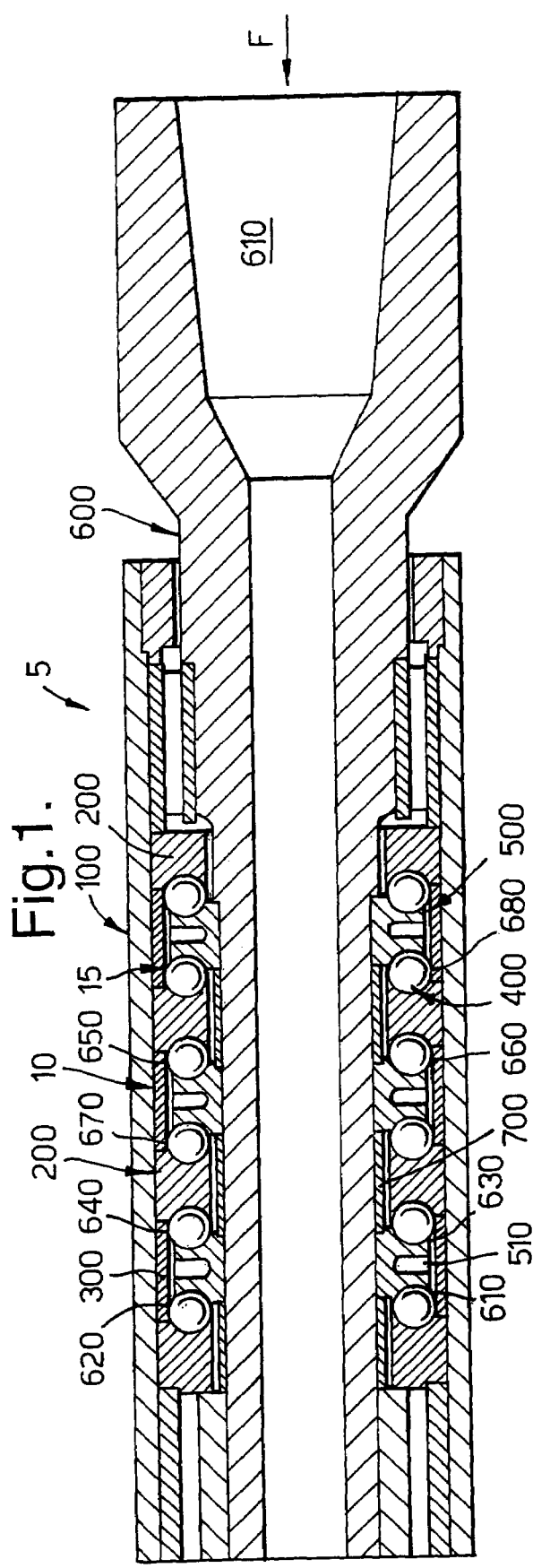

This invention relates to an improved bearing. Particularly, though not exclusively, the invention relates to an improved bearing assembly, eg. a thrust bearing assembly, which may be used in down-hole applications, eg. down-hole drilling applications, such as in the oil/gas production industries.

Thrust bearing assemblies for use in down-hole applications have the conflicting requirements of a thick shaft assembly and high axial load bearing capacity in a small cross-section. To achieve this a number of thrust bearings may be mounted in line to provide sufficient load and shock capacity. In conventional bearing assemblies this introduces a problem as the load may not be shared equally between the series of bearings which may result in excessive wear or failure of one or more of the bearings. This problem can be mitigated by use of assemblies of springs and spacers. However, these tend to be complex in nature. An additional problem in down-hole apparatus is that space tends to be limited.

It is an object of at least one aspect of the present invention to obviate or mitigate the aforementioned problems in the prior art.

It is a further object of at least one embodiment of at least one aspect of the present invention to seek to provide a flexible, load sharing, anti-friction bearing assembly/unit.

According to a first aspect of the present invention there is provided a bearing assembly having at least two bearing elements spaced by a first body, the first body having means for flexing.

Thus when a load is applied to the bearing assembly the first body may be caused to flex.

Advantageously the flexing means may comprise at least one groove or notch formed on the first body.

Preferably the first body is substantially annular in shape, the at least one groove preferably being formed on an outer surface of the first body.

Advantageously the groove is substantially U-shaped.

The first body may be rigidly mounted to a body to which load is applied, in use.

Preferably a first annular surface of the first body is provided with a first annular raceway.

Preferably also, a second annular surface of the first body is provided with a second annular raceway.

Advantageously the first and second bearing elements each comprise a plurality of balls, the first and second bearing elements preferably being received for movement within the first and second annular raceways of the first body.

In a preferred arrangement the means for flexing flexes about a longitudinal axis of the first body.

Further, in the preferred arrangement the groove is provided substantially circumferentially around the first body.

According to a second aspect of the present invention there is provided a bearing assembly having at least two bearing elements spaced by a first body, the first body being at least partly flexible.

According to a third aspect of the present invention there is provided a bearing unit comprising at least one and preferably a plurality of bearing assemblies according to the first aspect.

Advantageously each adjacent bearing assembly are spaced by a second body.

Preferably the second body is substantially annular in shape.

The second body may be rigidly mounted to a further body to which load is not (directly) applied in use.

Preferably a first annular surface of the second body is provided with a first annular raceway.

Preferably also, a second annular surface of the second body is provided with a second annular raceway.

Advantageously, respective first and second bearing elements may be received for movement within the first and second annular raceways of the second body.

Advantageously, adjacent first bodies are spaced by a respective first spacer element.

Advantageously also, adjacent second bodies are spaced by a respective second spacer element.

In one embodiment a further first spacer element may be provided between an end to which force is applied, in use, and an adjacent end of an adjacent first body.

According to a fourth aspect of the present invention there is provided a tool or apparatus including a bearing assembly according to the first aspect of the present invention or a bearing unit according to the second aspect of the present invention.

The tool may be a down-hole tool, eg. for use in a borehole of an oil/gas well.

The tool may comprise part of a borehole drilling apparatus, which may include a down-hole motor such as a Mointeau motor or a motor as disclosed in WO95/19488, the content of which is incorporated herein by reference.

The first body may be rigidly mounted to a shaft to which load is applied, in use.

The shaft may be contained substantially concentrically within the bearing assembly/unit.

The second body may be rigidly mounted to a housing.

The housing may substantially concentrically surround the bearing assembly/unit.

Advantageously, adjacent first bodies are longitudinally spaced by a first spacer element, which may also be mounted on the shaft.

Advantageously also, adjacent second bodies are longitudinally spaced by a second spacer element, which may also be mounted on the housing.

Embodiments of the present invention will now be described, by way of example only, with reference to the accompanying drawings, which are:

FIG. 1 a cross-sectional side view of a portion of a down-hole tool including a bearing assembly according to a first embodiment of the present invention.

Figure 2:
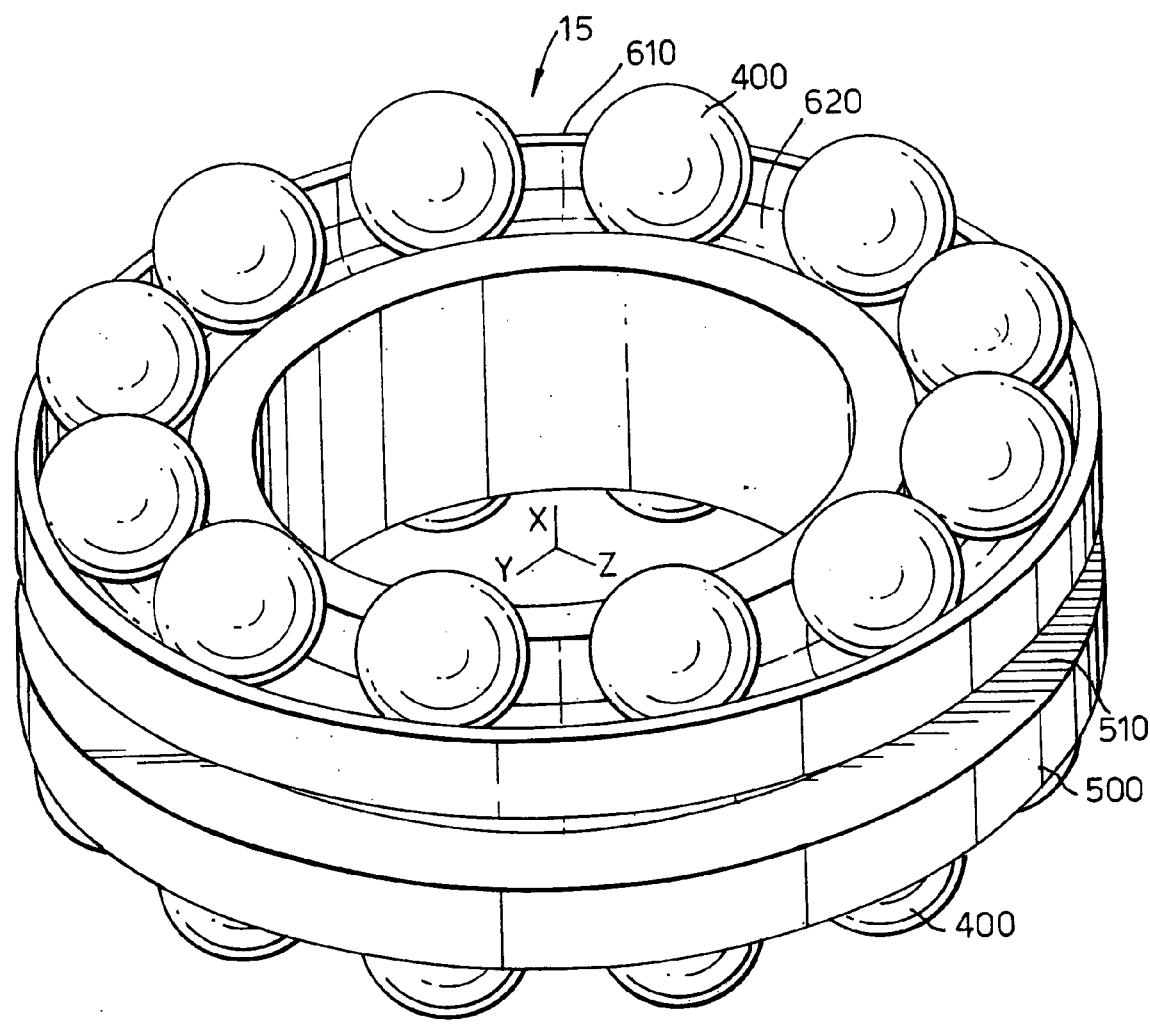

FIG. 2 a perspective view of a portion of the bearing assembly of FIG. 1.

Figure 3:
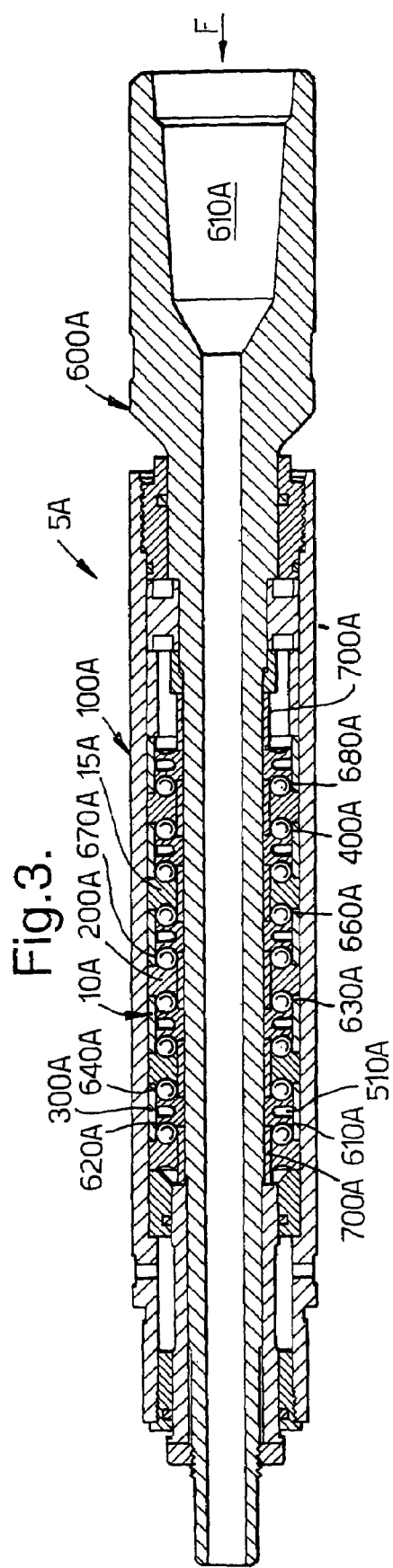

FIG. 3 a cross-sectional side view of a down-hole tool including a bearing assembly according to a second embodiment of the present invention.

Referring initially to FIG. 1 there is illustrated a portion of a down-hole tool, generally designated 5, according to a first embodiment of the present invention. The tool 5 may take the form of a borehole drilling apparatus. The tool 5 includes a bearing unit (pack) 10 comprising a series of adjacent bearing assemblies 15—in this embodiment three assemblies 15 are provided.

Each bearing assembly 15 has two anti-friction bearing elements 400 spaced by a first body 500, the first body 500 having means for flexing. Thus, when a load is applied to the bearing assembly 15, the first body 500 is caused to flex. In this embodiment the flexing means comprise at least one substantially circumferentially formed groove 510 formed on the first body 500.

The first body 500 is substantially annular in shape, the at least one groove 510 being formed on an outer surface of the first spacer body 500. As can be seen from FIGS. 1 and 2 the groove 510 is substantially U-shaped in side cross-section.

The first body 500 is rigidly mounted to a shaft 600 to which load is applied, in use, the shaft 600 being substantially concentrically contained within the bearing unit 10. The shaft 600 may be hollow and may have a socket 610 for connection, eg. to a drill bit or the like (not shown).

A first annular surface 610 of the first body 500 is provided with a first raceway 620. Further a second annular surface 630 of the first body 500 is provided with a second annular raceway 640. The first and second bearing elements 400 each comprise a plurality of balls, the first and second bearing elements 400 being received for movement within the first and second annular raceways 620, 640 of the first body 500.

The bearing unit 10 comprises a plurality of bearing assemblies 15. Each adjacent bearing assembly 15 are spaced by a second body 200. Each second body 200 is substantially annular in shape. The second bodies 200 are rigidly mounted to an outer housing 100 to which load is not (directly) applied, in use.

A first annular surface 650 of each second body 200 is provided with a first annular raceway 660. A second annular surface 670 of each second bodies 200 provided between adjacent assemblies 15 is provided with a second annular raceway 680. Second bodies 200 provided at ends of the unit 10 are only provided with one raceway 660—as can be seen from FIG. 1.

In this way respective first and second bearing elements 400 are received for movement within the first and second annular raceways 660, 670 of the second spacer body 200.

Referring to FIG. 1 the second bodies 200 are rigidly mounted to a housing 100. The housing 100 substantially concentrically surrounds the bearing unit 10.

A first raceway 620 of the first spacer body 500 faces a second raceway 680 of a second body 200. Similarly a second raceway 640 of the first body 500 faces a first raceway 660 of a second body 200.

As can be seen from FIG. 1 the first bodies 500 are longitudinally spaced along the shaft 600 and separated by first spacer elements 700 which may be rigidly mounted to the shaft 600. Further as can be seen from FIG. 1 the second bodies 200 are longitudinally spaced along the housing 100 and separated by second spacer elements 300 which may be rigidly mounted to the housing 100.

It is noted that the shaft 600 is free to rotate relative to the housing 100. Thus the first bodies 500 may rotate relative to the second bodies 200.

The components of the tool 5 may, in this embodiment be made from the following materials:

| | |
|---|---|
| housing 100 | steel |
| second bodies 200 | hardened steel |
| second spacer elements 300 | steel |
| bearing elements 400 | hardened steel and/or ceramic |
| first spacer bodies 500 | hardened steel |
| shaft 600 | steel |
| first spacer elements 700 | steel |

However, it will be appreciated that one may use any alloy steel capable of surface hardening to a case depth in the order of 10 thousandths of an inch by nitriding/carborising.

In use, the flexibility of bearing assembly 15 provides load sharing throughout the bearing unit 10. This flexibility is imparted by the grooves 510. As a (thrust) load F is applied to the shaft 600, a first body 500 deflects or flexes under the load F seeking to ensure that the next first bodies 500 are suitably positioned such that some of the load is then transferred through the adjacent inner spacer 700 to the next first body 500 and so on. This seeks to ensure that the load F is spread evenly between the bearing assemblies 15 in the unit 10, and is not supported by a single bearing assembly 15. Thus the load F is distributed in a way which is not possible using known rigid bearing assemblies. As each body 200, 500 is double sided the load F may be either tensile or compressive. In either case the load F will be shared over each of the bearing assemblies 15 of the unit 10.

Both static and dynamic tests have been carried out on 1¹¹⁄₁₆ inch flexible bearing unit 10 and its performance has been found to be even better than expected.

The bearing assembly 15 showed a linear deflection to 20 kN where shortly thereafter Brinelling occurred. This was then followed by a second linear deflection as both flexing of the horseshoe shaped groove 510, and to a lesser extent Brinelling continues. Deflection is. 0.8 mm before Brinelling occurs per bearing assembly 15, whereas predictions suggested 0.05 to 0.06 mm, an increase by a factor of 15. There was no damage to the bearing elements on any occasion.

From inspection of the raceways 620, 640 after testing, it was found that the load is applied at approximately 45 degrees towards shoulders of the raceways 620, 640 ie. away from the flexible portion, and is not vertical. The result is a much stronger bearing assembly 15 as it only has to cope with around 0.707 times the vertical force supplied, thus being able to carry more load. This load is also directed into the strongest and stiffest part of the raceways further increasing the load carrying capabilities.

For a bearing unit 10, each raceway can withstand in the region of 25 kN before significant damage occurs. For example, for 5 sets of raceways, the load before any serious problems would occur is approximately 125 kN or 12.7 tonnes, which far exceeds what is expected in the field.

The load is shared to a high degree after initial Brinelling of a first body raceway. However, under very high loads the raceway nearest the load deteriorates quicker and the subsequent failure propagated the load to the remaining raceways.

The Brinelling effect seen on the face of the first raceway does not deteriorate under higher loads.

The combination of the two dynamic tests using optimised spacers lasted for 219.5 hours at 0.1500 lbf WOB. Considering that a conventional 1¹¹⁄₁₆" MACDRILL (TM) motor as discussed in WO095/19488 has a stall torque at this force, it can be safe to assume that this load will not be seen for sustained periods when drilling. Bearing in mind, and the fact that the load to wear curve is exponential, the life expectancy of the flexible bearing unit 10 at normal operating loads could be substantially greater than the 219.5 hours, of which it was subjected to during tests.

In summary the flexible bearing assemblies 15 are much stronger than were thought as the load is acting at 45° through the raceways. The load path with (WOB) loading carries the load in towards the shaft 600 and not towards the horseshoe shaped grooves 510. This therefore results in the raceway flexing less than its design specification and subjected to Brinelling rather than flex actions. The bearing unit 10 produces the same effect as in known angular contact bearings but at a fraction of the cost.

There are a number of options that can improve the design of the bearing unit 10 so that the initial Brinelling on a first inner spacer can be reduced, eg:

1. Increase the groove 510 depth to increase the flex and assist in load sharing;
2. Incorporate an extra inner spacer to ensure the spring rate on the first body raceway and the rest of the raceways are the same.

Referring now to FIG. 3, there is illustrated a portion of a downhole tool, generally designated 5A, according to a second embodiment of the present invention. The tool 5A is similar to the tool 5 of the first embodiment, like parts being denoted by like integers but suffixed 'A'. However, the tool 5A differs from the tool in providing a extra inner spacer 700'A so as to seek to provide the advantage offered by (2) above.

It will be appreciated that the embodiments of the present invention hereinbefore described are given by way of example only, and are not meant to limit the scope of the invention in any way. It will, for example, be understood that the number of bearing assemblies forming a bearing unit may be selected to provide a desired load capacity.

It will further be appreciated that the present invention provides for a greater outer diameter of shaft therefore a larger (hex) coupling and therefore a higher torque capacity than known bearing unites. A greater outer diameter of shaft allows—for the same strength—a greater inner diameter of shaft and thus reduced pressure loss through the (drive) shaft.

The invention claimed is:

1. A bearing unit comprising a plurality of bearing assemblies, each bearing assembly having at least first and second bearing elements spaced by a first body, the first body having means for flexing, adjacent first bodies being spaced by a respective first spacer element.

2. A bearing unit as claimed in claim 1, wherein, in use, when a load is applied to the bearing assemblies, the first bodies are caused to flex.

3. A bearing unit as claimed in claim 1, wherein the flexing means comprises at least one groove or notch formed on the respective first body.

4. A bearing unit as claimed in claim 3, wherein each first body is substantially annular in shape, the at least one groove being formed on an outer surface of the respective first body.

5. A bearing unit as claimed in claim 4, wherein each groove is provided substantially circumferentially around the respective first body.

6. A bearing unit as claimed in claim 3 wherein each groove is substantially U-shaped.

7. A bearing unit as claimed in claim 1 wherein a first annular surface of each first body is provided with a first annular raceway.

8. A bearing unit as claimed in claim 7, wherein a second annular surface of each first body is provided with a second annular raceway.

9. A bearing unit as claimed in claim 8, wherein the first and second bearing elements each comprise a plurality of balls, the first and second bearing elements being received for movement within the first and second annular raceways of the respective first bodies.

10. A bearing unit as claimed in claim 1, wherein the means for flexing flexes about a longitudinal axis of the respective first body.

11. A bearing unit as claimed in claim 1 wherein each first body is rigidly mounted to a body to which load is applied, in use.

12. A bearing unit as claimed in claim 1 wherein adjacent bearing assemblies are spaced by a second body.

13. A bearing unit as claimed in claim 12, wherein the second body is substantially annular in shape.

14. A bearing unit as claimed in claim 12, wherein the second body is rigidly mounted to a further body to which load is not directly applied in use.

15. A bearing unit as claimed in claim 12, wherein a first annular surface of the second body is provided with a first annular raceway.

16. A bearing unit as claimed in claim 15, wherein a second annular surface of the second body is provided with a second annular raceway.

17. A bearing unit as claimed in claim 16, wherein respective first and second bearing elements are received for movement within the first and second annular raceways of the second body.

18. A bearing unit as claimed in claim 12, wherein adjacent second bodies are spaced by a respective second spacer element.

19. An apparatus including a bearing unit according to claim 1.

20. An apparatus as claimed in claim 19, for use in a borehole of an oil well or gas well.

21. An apparatus as claimed in claim 20, wherein adjacent bearing assemblies are spaced by a respective second body, each respective second body being longitudinally spaced by a second respective spacer element.

22. An apparatus as claimed in claim 21, wherein the each respective second spacer element is mounted on the housing.

23. An apparatus as claimed in claim 20, further comprising a down-hole motor.

24. An apparatus as claimed in claim 19 wherein the first body is rigidly mounted to a shaft to which load is applied, in use.

25. An apparatus as claimed in claim 24, wherein the shaft is contained substantially concentrically within the bearing unit.

26. An apparatus as claimed in claim 19, wherein adjacent bearing assemblies are spaced by a second respective body, each respective second body being rigidly mounted to a housing.

27. An apparatus as claimed in claim 26, wherein the housing substantially concentrically surrounds the bearing unit.

28. An apparatus as claimed in claim 19, wherein adjacent first bodies are longitudinally spaced by said respective first spacer element.

29. An apparatus as claimed in claim 28, wherein each respective first spacer element is mounted on the shaft.

30. A bearing unit comprising a plurality of bearing assemblies, each bearing assembly having at least two bearing elements spaced by a first body, the first body being at least partly flexible, adjacent first bodies being spaced by a respective first spacer element.

* * * * *